United States Patent [19]

Harmon

[11] Patent Number: 5,363,402
[45] Date of Patent: Nov. 8, 1994

[54] HF RADIO APPARATUS OPERABLE IN MULTIPLE COMMUNICATION MODES

[75] Inventor: James V. Harmon, Cedar Rapids, Iowa

[73] Assignee: Rockwell International Corp., Seal Beach, Calif.

[21] Appl. No.: 118,535

[22] Filed: Sep. 8, 1993

[51] Int. Cl.⁵ .............................................. H04K 1/00
[52] U.S. Cl. ............................................ 375/1; 380/34; 455/78; 455/88
[58] Field of Search ............... 375/1; 380/34; 455/88, 455/103, 78, 79, 140

[56] References Cited

U.S. PATENT DOCUMENTS

| | | | |
|---|---|---|---|
| 3,832,636 | 8/1974 | Kubo | 325/25 |
| 3,939,417 | 2/1976 | Cannalte et al. | 455/88 X |
| 4,105,974 | 8/1978 | Rogers | 455/88 |
| 4,155,040 | 5/1979 | Harmon et al. | 325/25 |
| 4,276,654 | 6/1981 | Nations et al. | 455/160 |
| 4,328,581 | 5/1982 | Harmon et al. | 371/8 |
| 4,476,582 | 10/1984 | Strauss et al. | 455/166 |
| 4,633,515 | 12/1986 | Uber et al. | 455/166 |
| 4,903,324 | 2/1990 | Warnagiris | 455/69 |
| 4,905,221 | 2/1990 | Ichiyoshi | 375/1 X |
| 5,191,593 | 3/1993 | McDonald et al. | 375/1 |
| 5,299,228 | 3/1994 | Hall | 375/1 |

FOREIGN PATENT DOCUMENTS

| | | |
|---|---|---|
| 0182762A1 | 5/1986 | European Pat. Off. . |
| 62-91029 | 4/1987 | Japan . |
| 0105538 | 5/1988 | Japan .................................. 455/88 |
| 64-11428 | 1/1989 | Japan . |
| 1-173927 | 7/1989 | Japan . |

Primary Examiner—Tod R. Swann
Attorney, Agent, or Firm—Kyle Eppele; M. Lee Murrah; H. Fredrick Hamann

[57] ABSTRACT

An HF radio transceiving apparatus that maintains communication integrity by employing a plurality of receivers, each capable of operating in separate and independent communication modes. One embodiment of the apparatus includes an antenna, a programmed controller having a plurality of control signals, first and second receivers and a transmitter section. The receivers receive and demodulate radio signals transmitted from external radios in common or mutually exclusive communication modes, and provide link-data information to the programmed controller. The transmitter, responsive to the programmed controller and coupled to the antenna, transmits modulated data in one of the common or mutually exclusive communication modes. The controller commands the first and second receivers and the transmitter such that the transmitter is dynamically paired with the appropriate receiver for operation in the desired communications mode as determined manually by the operator or by an appropriate automatic communications protocol.

20 Claims, 2 Drawing Sheets

HF RADIO APPARATUS OPERABLE IN MULTIPLE COMMUNICATION MODES

FIELD OF THE INVENTION

The present invention relates generally to radio frequency (RF) communication and, more particularly, to HF radio transceivers capable of receiving in multiple communications modes simultaneously and transmitting in one of the selected multiple communications modes when keyed.

BACKGROUND OF THE INVENTION

A new degree of complexity in establishing and maintaining communications links has been brought about by the introduction of new mutually exclusive communications modes.

Waveforms which cannot be simultaneously received through a single receiver whose front-end has a single RF translation signal path, are defined as "mutually exclusive" of each other. For purposes of this document, mutual exclusivity is characterized by virtue of the different frequency agility requirements placed upon the receiver's RF tuner. For purposes of illustration, but not as a limitation, conventional fixed frequency HF single sideband (SSB), channel scanning automatic link establishment (ALE) (described in detail in U.S. Pat. No. 4,328,581, herein incorporated by reference), and frequency hopping signals are three examples of different waveforms (communications modes) that are considered mutually exclusive.

A receiver and transmitter configured as a conventional transceiver can either receive or transmit as determined by the state of the Push-to-Talk (PTT) key but can not do both simultaneously. All operations described herein assume stations configured as transceivers unless otherwise stated.

A first given station may periodically need instantaneous PTT communications with a particular second station while both stations are operating in a network comprised of a plurality of additional stations, all of which are operating in a scanning ALE communications mode. Prior art allows an ALE link to be established automatically within tens of seconds between any two stations in the network. However, if instant PTT communications is required between two particular stations, those stations must leave the ALE scanning mode and remain on a propagating fixed frequency to avoid the linking delays. The two stations, now operating in a mutually exclusive mode from the other network stations, will not be able to monitor the other scanned ALE channels for calls or sounds which greatly reduces their availability for communications with other network stations. Furthermore, as time passes and propagation conditions change, the selected fixed frequency may no longer support skywave communications between the two stations. Thus, what was an instant PTT link the last time it was used, may now be a total outage. It will become evident to one of the two stations that there has been an outage when communications is attempted and fails. The other station may not be aware of the failure for some time until it also attempts to communicate with the other station and fails. The first station is helpless to reestablish the link until the second station also recognizes the outage and returns its system to the ALE scanning mode. Lack of current link quality analysis (LQA) data decreases the probability of first time success on the ALE call back which further aggravates the link reestablishment delay problem following an outage.

Because of the "scanning" nature of HF ALE waveforms and linking protocols, operation in the ALE mode precludes the use of the HF radio transceiver for monitoring conventional fixed frequency (non scanning) HF single sideband (SSB) channels or operation in a frequency hopping mode. Likewise, because of the rapid retuning requirements placed on a transceiver reflecting the nature of a frequency hopping waveform, operation in a frequency hopping mode precludes the use of the HF radio transceiver for monitoring conventional fixed frequency HF SSB or ALE scanning modes.

A prior art solution to the above problems requires the use of multiple HF transceivers (one for each different waveform or communications mode to be monitored), multiple antennas (or appropriate antenna switching and transmit antenna interlock circuits to allow the shared use of one antenna) and an appropriate system-level means of selecting which HF transmitter is to be keyed when a transmission is to be made.

Accordingly, there is a present need for an HF radio transceiver which can monitor multiple waveforms simultaneously and dynamically allocate its transmitter to the appropriate waveform according to the circumstance.

SUMMARY OF THE INVENTION

The present invention satisfies an immediate need in the field of HF radio communication by providing an apparatus and method of HF radio communication which can perform the functions of multiple frequency-agile transceivers using a single transceiver configured with multiple independent receivers and a single dynamically allocated transmitter. An embedded programmable controller coordinates the use of the multiple receivers so that the radio transceiver can simultaneously receive in multiple mutually exclusive communication modes, with each of the receivers dedicated to its respective mode and the controller automatically event-sharing the transmitter between the communication modes.

In accordance with another aspect of the present invention, an HF radio transceiver apparatus maintains communication integrity by employing multiple receivers, each capable of operating independently of each other and using the same or different communication modes. The apparatus includes an antenna, a programmed controller having a plurality of control signals, a plurality of receivers and a transmitter. The receivers are capable of simultaneously receiving and demodulating mutually exclusive RF signals transmitted from external transmitters and providing link-status information to the programmable controller. The transmitter of the subject radio transceiver is responsive to the programmable controller, coupled to the antenna, and able to transmit modulated information in one of the mutually exclusive communication modes when keyed.

In one embodiment, the controller commands the first and second receivers such that one of the receivers is paired with the transmitter to maintain a first communication link in one communication mode while the second receiver is used to monitor a second communications mode in order to: (1) notify the operator of other calls or signals heard; (2) interrupt the existing communications link and automatically reassign the transmitter to answer an incoming call with priority status; and (3) coordinate the reestablishment of the first communications link should that link have failed inadvertently.

In another embodiment, the controller commands the first and second receivers such that each is independently capable of receiving an incoming call in a different communications mode with the transmitter automatically configured to respond in a mode corresponding to a call received by either receiver.

The above summary is not intended to describe each aspect of the present invention, as this is the purpose of the discussion that follows.

BRIEF DESCRIPTION OF THE DRAWINGS

Other aspects and advantages of the invention will become apparent upon reading the following detailed description and upon reference to the drawings in which.

Figure 1:
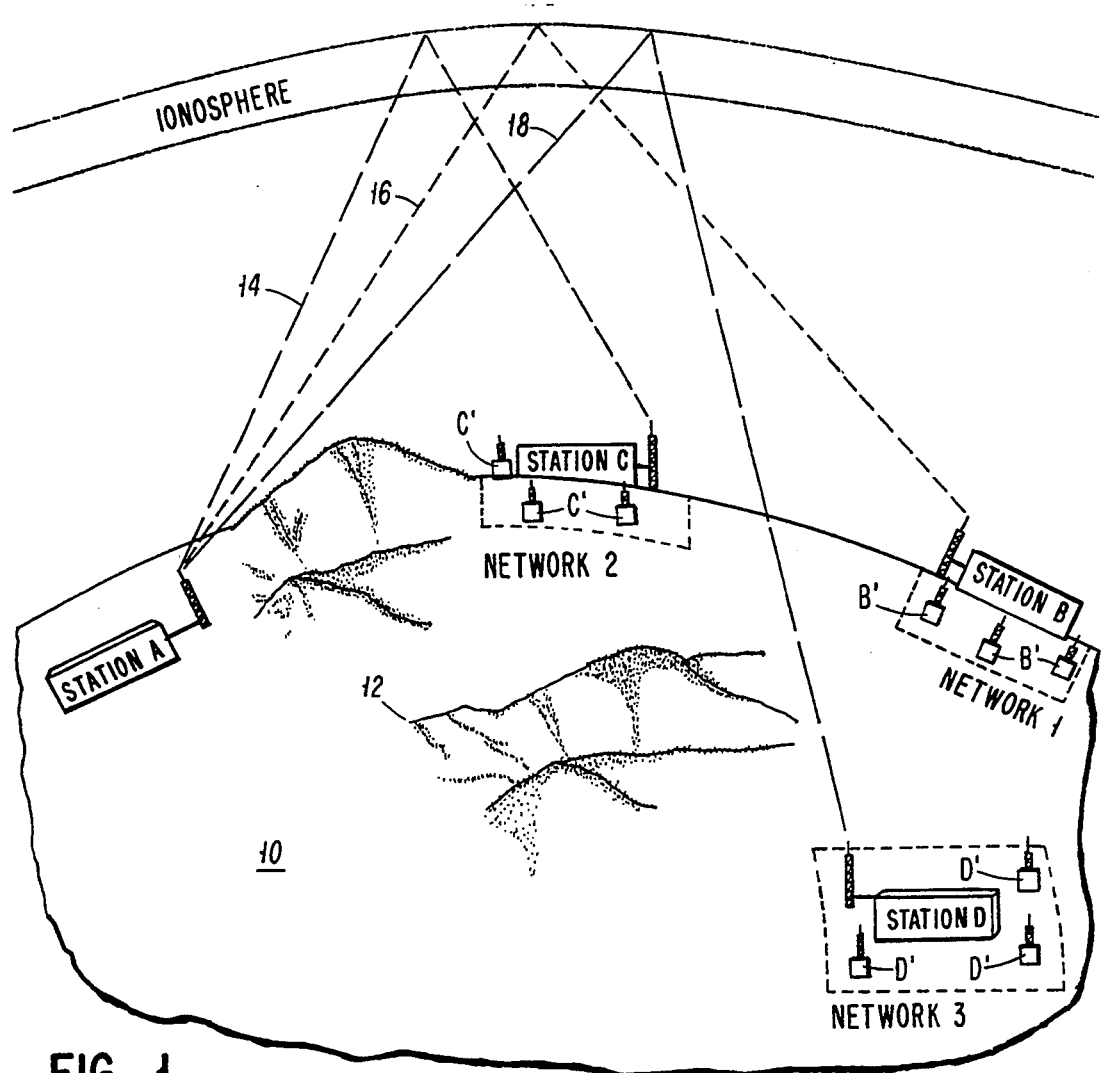
FIG. 1 depicts an exemplary operating setting for HF radio communications.

While the invention is susceptible to various modifications and alternative forms, a specific embodiment thereof has been shown by way of example in the drawings and will be described in detail. It should be understood, however, that the given examples are not intended to limit the invention to the particular forms described. On the contrary, the intention is to cover all modifications, equivalents and alternatives falling within the spirit and scope of the invention as defined by the appended claims.

DETAILED DESCRIPTION OF THE SPECIFIC EMBODIMENTS

Referring now to the Figures, wherein like items are referenced as such throughout, FIG. 1 illustrates a global setting of exemplary HF radio communications. Four stations A, B, C, and D are assumed to be separated by beyond-line-of-sight distances due to the curvature of the earth's surface 10 or to geographical formations 12. HF radio communication is accomplished in such settings by reflecting the transmitted signal 14, 16, and 18 off the atmosphere (ionosphere) to the desired receiver, a technique well known in the prior art and often referred to as skywave communications. It is understood that signals 14, 16, and 18 are mutually exclusive waveforms and, for ease of understanding, are depicted as signals having varied dashed length.

Associated with the respective stations B, C, and D are a plurality of additional stations B', C', and D' collectively forming networks 1, 2, and 3, respectively. As depicted, station A is required to participate in random communications with stations from all three networks as represented by stations B, C, and D where each of the networks is operating in a mutually exclusive mode with respect to the other networks.

Additionally, station A is required to participate as a member of all three networks and thus must be able to monitor the mutually exclusive waveforms used by each network and respond to calls from any network member using the appropriate waveform.

Using prior art HF equipment, stations A and B may operate normally in a desired communications mode, such as ALE, with each other and with network members B' that are also operating in the ALE mode. Although prior art apparatus and techniques allow such communication, all users must be tolerant of delays of tens of seconds required to complete a scanning ALE call. However, if instant PTT connectivity is required between stations A and B, they must leave the ALE mode and remain tuned to a propagating fixed frequency that thereby provides PTT type communications. Once switched out of the ALE mode to a second mutually exclusive waveform, such as the fixed frequency mode, neither station A nor B is available to scan the current ALE frequency list for sounds or calls from other stations B'. Also, as time passes and propagation conditions change, the selected fixed frequency may no longer support skywave communications between stations A and B. Thus, what was an instant link the last time it was used may now be a total outage and since stations A and B have been operating on a fixed frequency, there have been no ALE sounds received and no LQA updates to guide the automatic channel selection process for establishing a new link.

Figure 2:
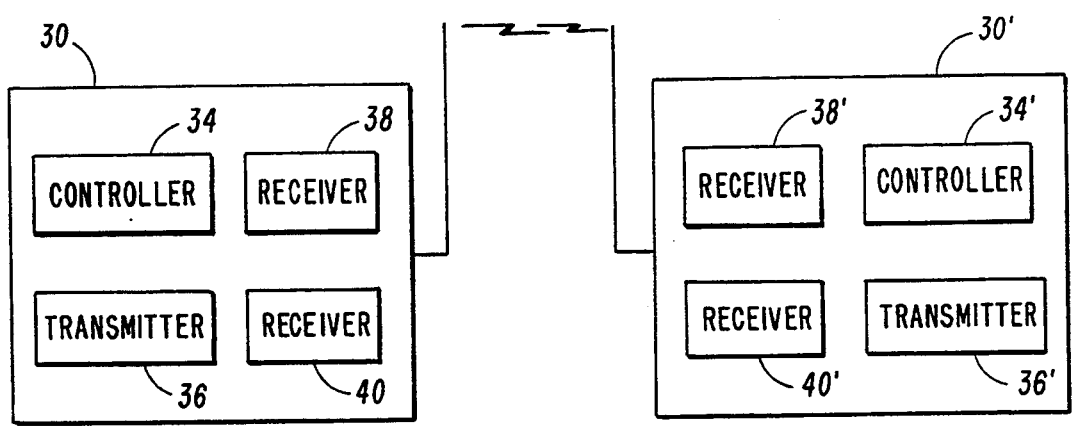
FIG. 2 is a block diagram of an HF radio transceiver system, in accordance with the present invention.

The present invention provides a unique solution to such problems and provides a multi-mode communications availability from a single transceiver by combining multiple receivers with one transmitter in a single physical package. The multiple receivers are equipped with the necessary control and demodulation capabilities to simultaneously monitor multiple mutually exclusive waveforms. FIG. 2 shows a radio communication system having two radio transceivers 30, (30') each capable of operating in two mutually exclusive communication modes. Each radio transceiver 30, (30') includes a controller 34, (34'), a transmitter 36, (36') and two conventional receivers 38, 40, (38', 40'). It is understood that a number of receivers larger than two may be utilized but, for simplicity of explanation, two are herein described.

The receivers 38 and 40 (38' and 40') and the transmitter 36, (36') include a digital synthesizer (not shown), which is controlled by the controller 34, (34') to provided the required frequency-agile receive and transmit conversion injection frequencies. Also not shown are the modulation/demodulation and control functions provided by the controller 34, (34') and required to execute the protocol characteristics and encoding/decoding functions that transmit and receive the information peculiar to each specific waveform.

The controller 34, (34') selects the operational modes for each receiver 38, 40, (38', 40') and automatically configures the singular transmitter 36, (36') for operation in whichever of the corresponding modes is required. In this manner, a single transmitter can be used to support multiple receivers since an operator can talk on only one network at a time, even though he can listen to as many networks as there are dedicated receivers.

The information needed to make an automatic decision regarding the transmitter mode is available locally within the radio 30, (30'), thereby eliminating the need for complex external system/equipment interfaces. This includes receive multicoupling, transmit/receive (T/R) switching, and keyline interlock functions needed to use a single antenna system for both receive and transmit functions.

Figure 3:
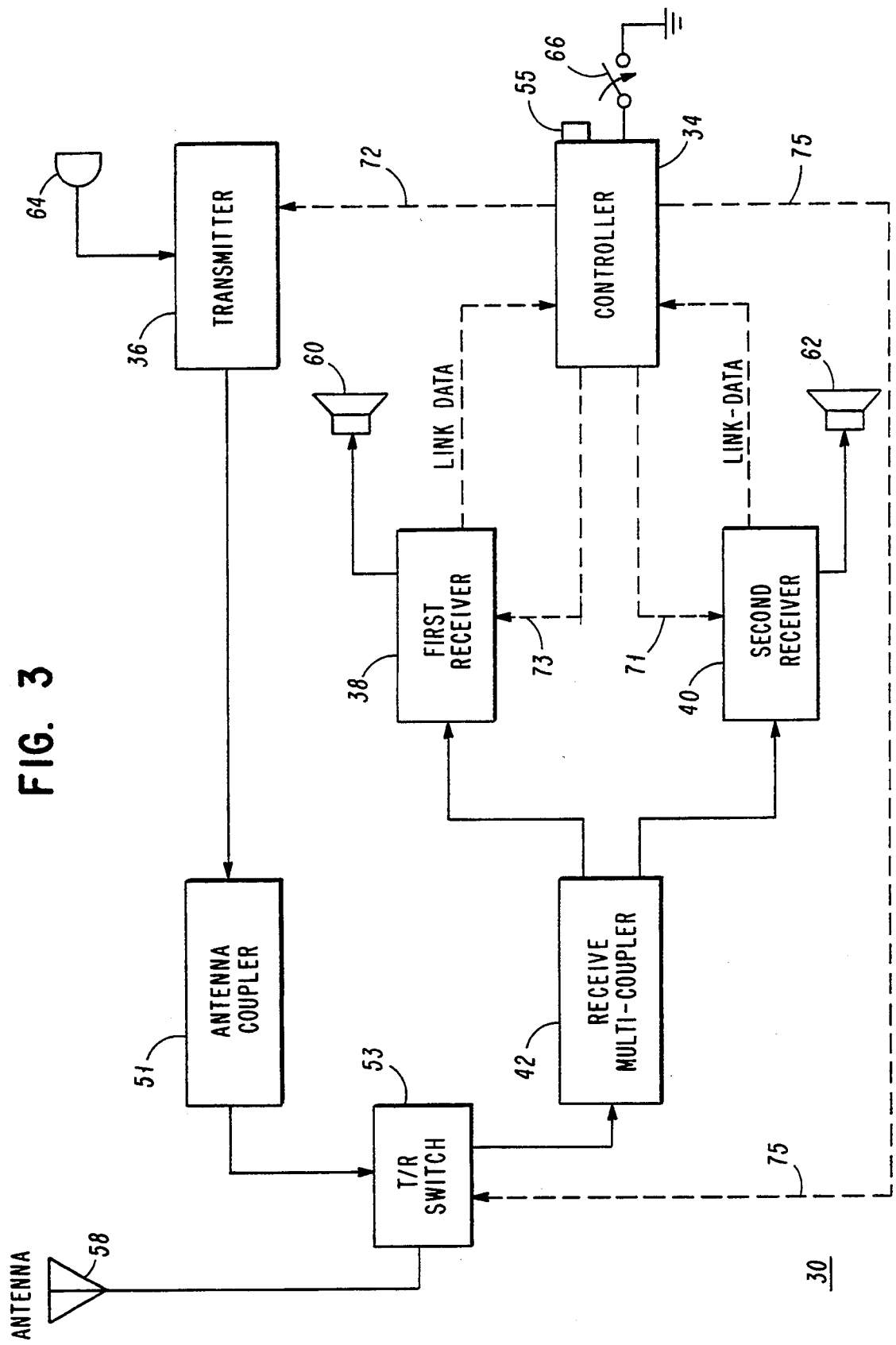
FIG. 3 is a block diagram of the HF radio transceiver apparatus of FIG. 2.

FIG. 3 illustrates one embodiment of the HF radio transceiver 30 of FIG. 2. The radio 30 includes a transmitter 36, a first receiver 38, a second receiver 40, and a controller 34. While a dedicated antenna for each type of receiver may be used, the depicted embodiment employs a single antenna 58 for propagating RF signals from the transmitter 36, via an antenna coupler 51, and an antenna T/R switch 53, and for propagating RF signals to each of the receivers 38 and 40, via the T/R switch 53, and a receive multi-coupler 42. Each receiver 38 and 40 provides a respective demodulated signal to an associated output device, such as speakers 60 and 62. The transmitter 36 is modulated via an input device, such as a conventional microphone 64.

The controller 34 coordinates the transmission and reception functions of the transmitter 36 and the receivers 38 and 40 via control signals sent over leads 71, 72, 73 and 75 in response to link data received over an established communication link with an external radio transmitter and push-to-talk (PTT) switch 66 inputs from the operator. Lead 73 is used to control the frequency and timing of the first receiver 38 operating in the first mode. Lead 71 is used to control the frequency and timing for the second receiver 40 for proper communication with an additional transceiver (not shown) operating in the second mode. Lead 72 is used by the controller 34 to activate the transmitter 36 in the proper mode according to the setting of the mode selector switch 55 and in response to closure of the PTT switch 66, so as not to interfere with the reception of information over the antenna 58. The control mode selector switch 55 is used to set the controller 34 to the proper mode in which to transmit the modulating information when calls are being initiated locally from the radio transceiver 30. The mode selection normally performed by switch 55 may be accomplished automatically by the controller 34 when receiving and responding to incoming calls in an automatic mode. Thus, using receiver 38 in one communication mode and receiver 40 for simultaneously receiving a mutually exclusive communication mode, the controller 34 appropriately controls the transmitter 36 so that the radio 30 can receive and transmit signals over either of the two types of communication modes.

By providing multiple types of communication modes in which a radio can operate, the user of the radio is able to minimize delay in setting up and/or reestablishing a communication link, communicate with different types of radio systems without the typical requirement for multiple radios, and use the independent communication mode capability as a means of monitoring two separate communication channels.

For example, assume that each of two radio stations A and B are equipped with transceivers 30, 30' which include a first receiver 38, 38' operating in a frequency scanning (e.g., ALE) mode which scans channels 1-10 and a second receiver 40 40' operating in a conventional fixed frequency mode on one of a selected number of assigned channels, with the transmitter 36, 36' in each transceiver 30, 30' capable of communicating in both modes. Further assume that a communication link has been established using the conventional fixed frequency (channelized) communication mode, and that the first receiver 38, 38' reverts to the normal ALE scanning mode when idle and not otherwise in engaged in a communications link. Should interference or changes in skywave propagation cause the fixed frequency communication link to be lost, the first station to attempt communications following the loss will recognize the outage and can immediately initiate an ALE call to the other station to reestablish the link on a new channel even before the second station may have realized the link had been lost. The controller in the transceiver initiating the link automatically sends a scanning ALE call and the idle scanning receiver in the second station receives the call and responds automatically according to ALE protocol. The operators may now coordinate switching to a new fixed frequency mode using the second receiver for that purpose and allowing the first receiver to return to the idle ALE scanning receive mode. Thus, one of the radio's receivers is used with the transmitter in a dedicated instant-access PTT communications mode intended to maintain a communication link for a substantial period of time and, in response to an inadvertent link outage, the other communication receiver, which has been scanning and maintaining a current LQA data base, is paired with the transmitter and used to quickly restore the lost fixed frequency link using the ALE scanning call mode to reestablish contact.

In another application for the present invention, the controller 34 in the radio 30 commands the respective first and second receivers 38, 40 such that at least one of the communication modes is used to maintain a communication link for a substantial period of time and, in response to an incoming call in the other of the communication modes, the maintained link is interrupted and the incoming call is established as a priority call.

Those skilled in the art will readily recognize that various modifications and changes may be made to the present invention, without departing from the true spirit and scope thereof, which is set forth in the following claims.

I claim:

1. An HF radio transceiver apparatus, comprising:
    antenna means;
    a programmable controller having a plurality of control signals;
    a plurality of receivers, connected to the antenna means, each receiving and demodulating radio signals transmitted from external radios, in common or mutually exclusive communication modes, and providing link-data information to the programmable controller;
    a transmitter, responsive to the programmable controller and coupled to the antenna means, for transmitting modulated data in at least one of the common or mutually exclusive communication modes; and
    the programmable controller commanding the plurality of receivers such that one of the receivers paired with the transmitter and operating in one of the communication modes is used to maintain a communication link for a substantial period of time and, in response to a communication link outage, a second receiver is paired with the transmitter operating in a second communication mode to reestablish the failed communication link.

2. The apparatus, according to claim 1, wherein the mutually exclusive communication modes include an automatic-link-establishment mode.

3. The apparatus, according to claim 1, wherein said mutually exclusive communication modes include a frequency hopping mode.

4. The apparatus, according to claim 1, wherein at least one of said receivers demodulates other than HF signals.

5. The apparatus, according to claim 1, wherein the mutually exclusive communication modes include a communication mode initializing communication with an external radio by programming the programmable controller and the external radio with an assigned time and assigned frequency.

6. The apparatus, according to claim 5, wherein the mutually exclusive communication modes includes an automatic-link-establishment mode.

7. An HF radio transceiver apparatus, comprising:
antenna means;
a programmable controller having a plurality of control signals;
a first receiver and a second receiver receiving modulated data from said antenna means, said first and second receivers each receiving and demodulating radio signals transmitted from external radios in mutually exclusive communication modes and providing link-data information to the programmable controller;
a transmitter, responsive to the programmable controller, and coupled to the antenna means, for transmitting modulated data in one of two mutually exclusive communication modes; and
said programmable controller commanding the first and second receivers such that one of the receivers is paired with the transmitter, operating in one of said communication modes, is used to maintain a communication link for a substantial period of time and, in response to an incoming call received by the second receiver operating in the other of said communication modes, the second receiver, providing link data to the controller, causes the maintained link to be interrupted, the transmitter to be paired with the second receiver, and the incoming call established as a priority communications link.

8. The apparatus, according to claim 7, wherein said interruption of the maintained link is temporary.

9. The apparatus, according to claim 7, wherein said mutually exclusive communication modes include an automatic-link-establishment mode.

10. The apparatus, according to claim 7, wherein said mutually exclusive communication modes include a frequency hopping mode.

11. The apparatus, according to claim 7, wherein at least one of said receivers demodulates other than HF signals.

12. The apparatus, according to claim 7, wherein said mutually exclusive communication modes include a communication mode initializing communication with an external radio by programming the programmable controller and the external radio with an assigned time and assigned frequency.

13. The apparatus, according to claim 12, wherein said mutually exclusive communication modes include an automatic-link-establishment mode.

14. An HF radio transceiver apparatus, comprising:
antenna means;
a programmable controller having a plurality of control signals;
a plurality of receivers, each receiving and demodulating radio signals transmitted from external radios in mutually exclusive communication modes, and providing link-data information to the programmable controller;
a transmitter, responsive to the programmable controller and coupled to the antenna means, for transmitting modulated data in one of said mutually exclusive communication modes; and
said controller, monitoring the receivers, and detecting predetermined signals from one of the receivers via the link data from said receiver, pairs the transmitter for operation with said receiver to respond appropriately according to a predetermined link protocol in one of the communication modes.

15. The apparatus, according to claim 14, wherein said mutually exclusive communication modes include an automatic-link-establishment mode.

16. The apparatus, according to claim 14, wherein at least one of said receivers demodulates other than HF signals.

17. The apparatus, according to claim 14, wherein at least one of said receivers demodulates other than HF signals.

18. The apparatus, according to claim 14, wherein said mutually exclusive communication modes include a frequency hopping mode.

19. The apparatus, according to claim 14, wherein said mutually exclusive communication modes include a communication mode initializing communication with an external radio by programming the programmable controller and the external radio with an assigned time and assigned frequency.

20. The apparatus, according to claim 19, wherein said mutually exclusive communication modes include an automatic-link-establishment mode.

* * * * *